US012676556B2

(12) United States Patent
Yang et al.

(10) Patent No.: US 12,676,556 B2
(45) Date of Patent: Jul. 7, 2026

(54) SWITCHING TUBE CONTROL METHOD AND DEVICE, AND DIRECT-CURRENT CONVERTER

(71) Applicant: ALTENERGY POWER SYSTEM INC., Jiaxing (CN)

(72) Inventors: Yongchun Yang, Jiaxing (CN); Shuozu He, Jiaxing (CN); Yuhao Luo, Jiaxing (CN)

(73) Assignee: ALTENERGY POWER SYSTEM INC., Jiaxing (CN)

( * ) Notice: Subject to any disclaimer, the term of this patent is extended or adjusted under 35 U.S.C. 154(b) by 421 days.

(21) Appl. No.: 18/710,200

(22) PCT Filed: Jan. 17, 2022

(86) PCT No.: PCT/CN2022/072280

§ 371 (c)(1),
(2) Date: May 15, 2024

(87) PCT Pub. No.: WO2022/166566

PCT Pub. Date: Aug. 11, 2022

(65) Prior Publication Data

US 2025/0030349 A1       Jan. 23, 2025

(30) Foreign Application Priority Data

Feb. 8, 2021    (CN) .......................... 202110182359.5

(51) Int. Cl.
*H02M 3/335* (2006.01)
*H02M 1/00* (2006.01)
*H02M 3/00* (2006.01)

(52) U.S. Cl.
CPC ..... *H02M 3/33573* (2021.05); *H02M 1/0058* (2021.05); *H02M 3/01* (2021.05)

(58) Field of Classification Search
CPC ......... H02M 3/33573; H02M 3/33569; H02M 3/01; H02M 1/0058
See application file for complete search history.

(56) References Cited

U.S. PATENT DOCUMENTS

2012/0026754 A1    2/2012  Ye et al.
2015/0138841 A1*   5/2015  Pahlevaninezhad .........................
                                       H02M 3/33573
                                       363/17
(Continued)

FOREIGN PATENT DOCUMENTS

CN        201352763 Y     11/2009
CN        104135159 A     11/2014
(Continued)

OTHER PUBLICATIONS

International Search Report for PCT/CN2022/072280 mailed Mar. 29, 2022, ISA/CN.
(Continued)

*Primary Examiner* — Alex Torres-Rivera
(74) *Attorney, Agent, or Firm* — Yue (Robert) Xu; Apex Attorneys at Law, LLP

(57)     ABSTRACT

A switching tube control method and device, and a direct-current converter. In the solution, after a switching tube on a leading bridge arm in a phase-shifted full-bridge converter is disconnected and a current on a transformer is not greater than a current preset value, a corresponding switching tube on a lagging bridge arm is controlled to be disconnected, and it is ensured that the current flowing through the switching tube is small when the switching tube on the lagging bridge arm is disconnected, such that the soft turn-off of the switching tube on the lagging bridge arm is realized, the loss is reduced, the anti-interference capability of the switching tube is improved, and the EMS performance of the switching tube is improved.

9 Claims, 8 Drawing Sheets

(56)  References Cited

U.S. PATENT DOCUMENTS

| 2016/0049858 A1 | 2/2016 | Kim et al. |
| 2016/0111964 A1* | 4/2016 | Oki et al. |
| 2018/0147945 A1* | 5/2018 | Yang ........................ B60L 53/20 |
| 2018/0309373 A1 | 10/2018 | Chang et al. |
| 2019/0199197 A1 | 6/2019 | Hamada et al. |
| 2022/0045618 A1* | 2/2022 | Kumar ................... H02J 7/007 |
| 2022/0337166 A1* | 10/2022 | Chan ................. H02M 3/33584 |

FOREIGN PATENT DOCUMENTS

| CN | 105375767 A | 3/2016 |
| CN | 105871215 A | 8/2016 |
| CN | 105978123 A | 9/2016 |
| CN | 106455278 A | 2/2017 |
| CN | 112910268 A | 6/2021 |
| JP | 2002209383 A | 7/2002 |

OTHER PUBLICATIONS

Hu Hong-lin et al, Reseach on Phase-shifted Full-bridge ZVS Converter , Power Electronics vol. 43 No. 1 Jan. 2009.
He Genhua et al, A secondary phase-shifted full-bridge soft switching converter with resonant voltage-doubler , Journal of Air Force Early Warning Academy , vol. 32 No. 3 , Jun. 2018.
European Search Report issued on Mar. 18, 2026 for European counterpart application No. 22748845.9.

* cited by examiner

SWITCHING TUBE CONTROL METHOD AND DEVICE, AND DIRECT-CURRENT CONVERTER

The present application is the national phase of International Patent Application No. PCT/CN2022/072280, titled "SWITCHING TUBE CONTROL METHOD AND DEVICE, AND DIRECT-CURRENT CONVERTER", filed on Jan. 17, 2022, which claims priority to Chinese Patent Application No. 202110182359.5, titled "SWITCHING TUBE CONTROL METHOD AND DEVICE, AND DIRECT-CURRENT CONVERTER", filed on Feb. 8, 2021 with the China National Intellectual Property Administration, both of which are incorporated herein by reference in their entireties.

FIELD

The present disclosure relates to the technical field of power electronics, and in particular to a method and device for controlling a switching transistor, and a direct-current to direct-current (DC-DC) converter.

BACKGROUND

In conventional technology, a DC-DC converter includes a direct-current power supply, a phase-shifted full-bridge circuit, a transformer, and a rectifier circuit, as shown in FIG. 1, which is a schematic structural diagram of a DC-DC converter in the conventional technology. In FIG. 1, after the switching transistor Q1 on a leading leg of the phase-shifted full-bridge circuit is turned off, the corresponding switching transistor Q4 on a lagging leg is controlled to be turned off, after the switching transistor Q2 on the leading leg of the phase-shifted full bridge circuit is turned off, the corresponding switching transistor Q3 in the lagging leg is controlled to be turned off. However, in the phase-shifted full-bridge circuit, the switching transistor on the lagging leg usually works in a hard switching state, that is, when the switching transistor is controlled to be turned off, the current flowing through the switching transistor is still very large, which causes a large loss of the switching transistor. In addition, the switching transistor has low anti-interference ability when working in the hard switching state and generates EMC (Electromagnetic Compatibility) noises.

SUMMARY

A method and a device for controlling a switching transistor, and a DC-DC converter are provided according to the present disclosure, which ensures a small current flowing through the switching transistor on the lagging leg when the switching transistor on the lagging leg is turned off, in order that the switching transistor on the lagging leg achieves soft-switching turn-off, so as to reduce the loss, improve the anti-interference ability of the switching transistor, and improve the EMS performance of the switching transistor.

In order to solve the above problems, a method for controlling a switching transistor, applicable to a direct-current to direct-current (DC-DC) converter is provided according to the present disclosure. The DC-DC converter includes a direct-current power supply, a phase-shifted full-bridge circuit, a transformer, and a rectifier circuit provided with an LC resonant circuit; and the method includes:

determining, after a switching transistor on a leading leg of the phase-shifted full-bridge circuit is turned off, whether a current through the transformer is less than or equal to a preset current value; and controlling a corresponding switching transistor on a lagging leg of the phase-shifted full-bridge circuit to be turned off based on determination that the current through the transformer is less than or equal to the preset current value.

In an embodiment, the DC-DC converter further includes a current transformer, an integrator circuit, an amplifier and a comparator connected in sequence, where an input terminal of the current transformer is connected to the transformer, the current transformer is configured to collect a current through the transformer; the integrator circuit is configured to integrate the current through the transformer to obtain a voltage signal; a bias voltage is applied to a positive input terminal of the amplifier, the amplifier is configured to amplify the voltage signal and add the bias voltage, and output an amplified voltage signal; the comparator is configured to compare the amplified voltage signal with a maximum integration threshold and a minimum integration threshold, output a first level based on determination that the amplified voltage signal is greater than the maximum integration threshold or less than the minimum integration threshold, and output a second level based on determination that the amplified voltage signal is less than the maximum integration threshold and greater than the minimum integration threshold; and the first level is opposite to the second level;

where the determining, after a switching transistor on a leading leg of the phase-shifted full-bridge circuit is turned off, whether a current through the transformer is less than or equal to a preset current value includes:

controlling the integrator circuit to integrate the current through the transformer and collected by the current transformer within an integration period to obtain the voltage signal, where the integration period starts from a time instant at which the switching transistor on the lagging leg of the phase-shifted full-bridge circuit is turned on, and ends at a time instant at which the comparator begins outputting the second level;

determining a phase-shift angle period based on the integration period and a resonance parameter of the LC resonant circuit;

determining whether the phase-shift angle period expires from a time instant at which the switching transistor on the leading leg of the phase-shifted full-bridge circuit is turned off, while determining whether the current through the transformer is less than or equal to the preset current value; and proceeding to the step of controlling the corresponding switching transistor on the lagging leg of the phase-shifted full-bridge circuit to be turned off based on determination that the current through the transformer is less than or equal to the preset current value at expiry of the phase-shift angle period.

In an embodiment, after the determining a phase-shift angle period based on the integration period and a resonance parameter of the LC resonant circuit, the method further includes:

determining a maximum phase-shift angle period;

determining whether the phase-shift angle period is less than the maximum phase-shift angle period;

proceeding to the step of determining whether the phase-shift angle period expires from a time instant at which the switching transistor on the leading leg of the phase-shifted full-bridge circuit is turned off, based on determination that the phase-shift angle period is less than the maximum phase-shift angle period;

determining whether the maximum phase-shift angle period expires from a time instant at which the switching transistor on the leading leg of the phase-shifted full-bridge circuit is turned off, based on determination that the phase-shift angle period is greater than or equal to the maximum phase-shift angle period; and proceeding to the step of controlling a corresponding switching transistor on a lagging leg of the phase-shifted full-bridge circuit to be turned off based on determination that the maximum phase-shift angle period expires.

In an embodiment, the determining a maximum phase-shift angle period includes:

determining the maximum phase-shift angle period based on junction capacitances of respective switching transistors in the phase-shifted full-bridge circuit, a leakage inductance parameter of a primary side of the transformer, the resonance parameter of the LC resonant circuit, an output voltage of the transformer, an output current of the transformer and the integration time period.

In an embodiment, after the controlling a corresponding switching transistor on a lagging leg of the phase-shifted full-bridge circuit to be turned off, the method further includes:

determining whether a preset dead period expires from a time instant at which the corresponding switching transistor on the lagging leg of the phase-shifted full-bridge circuit is turned off;

controlling another switching transistor on the lagging leg of the phase-shifted full-bridge circuit to be turned on at expiry of the preset dead period.

In an embodiment, before the determining whether a preset dead period expires from a time instant at which the corresponding switching transistor on the lagging leg of the phase-shifted full-bridge circuit is turned off, the method further includes:

determining an LC resonant period of a primary side of the transformer based on junction capacitances of respective switching transistors in the phase-shifted full-bridge circuit and a leakage inductance parameter of the primary side of the transformer;

determining a maximum dead period based on the LC resonant period of the primary side of the transformer;

setting the preset dead period based on the maximum dead period, where the preset dead period is less than the maximum dead period; and proceeding to the step of determining whether a preset dead period expires from a time instant at which the corresponding switching transistor on the lagging leg of the phase-shifted full-bridge circuit is turned off.

In an embodiment, the DC-DC converter further includes a current transformer, an amplifier and a comparator connected in sequence, where an input terminal of the current transformer is connected to the transformer, and the current transformer is configured to collect a current through the transformer; the amplifier is configured to amplify the current through the transformer and collected by the current transformer and output an amplified current signal; the comparator is configured to compare the amplified current signal with a preset current value, output a third level based on determination that the amplified current signal is less than or equal to the preset current value, and output a fourth level based on determination that the amplified current signal is greater than the preset current value; and the third level is opposite to the fourth level;

the determining, after a switching transistor on a leading leg of the phase-shifted full-bridge circuit is turned off, whether a current through the transformer is less than or equal to a preset current value includes:

determining, after the switching transistor on the leading leg of the phase-shifted full-bridge circuit is turned off, whether an output signal of the comparator is the third level; and proceeding to the step of controlling a corresponding switching transistor on a lagging leg of the phase-shifted full-bridge circuit to be turned off based on determination that the output signal of the comparator is the third level.

In an embodiment, before the determining, after a switching transistor on a leading leg of the phase-shifted full-bridge circuit is turned off, whether a current through the transformer is less than or equal to a preset current value, the method further includes:

determining an expected value for the current through the transformer based on a load connected to an output terminal of the DC-DC converter;

determining, after the corresponding switching transistor on the lagging leg is turned on, whether the current through the transformer reaches the expected value;

controlling the switching transistor on the leading leg of the phase-shifted full-bridge circuit to be turned off based on determination that the current through the transformer reaches the expected value; and proceeding to the step of determining, after a switching transistor on a leading leg of the phase-shifted full-bridge circuit is turned off, whether a current through the transformer is less than or equal to a preset current value.

In order to solve the above problems, a device for controlling a switching transistor is provided according to the present disclosure. The device includes:

a memory, configured to store computer instructions; and a processor, configured to execute the computer instructions to implement steps of the above method for controlling a switching transistor.

In order to solve the above problems, a direct-current to direct-current converter is provided. The direct-current to direct-current converter includes the above device for controlling a switching transistor, further includes a direct-current power supply, a phase-shifted full-bridge circuit, a transformer and a rectifier circuit provided with an LC resonant circuit connected in sequence, and further includes:

a current transformer, an amplifier and a comparator connected in sequence; where an input terminal of the current transformer is connected to the transformer, and the current transformer is configured to collect a current through the transformer;

the amplifier is configured to amplify the current through the transformer and collected by the current transformer, and output an amplified current signal; and the comparator is configured to compare the amplified current signal with a preset current value, and output a third level based on determination that the amplified current signal is less than or equal to the preset current value, and output a fourth level based on determination that the amplified current signal is greater than the preset current value, and the third level is opposite to the fourth level.

A method and a device for controlling a switching transistor, and a DC-DC converter are provided in the present disclosure. In the solution, after the switching transistor on the leading leg of the phase-shifted full-bridge converter is turned off and when the current through the transformer is not greater than the preset current value, the corresponding switching transistor on the lagging leg is controlled to be turned off, to ensure a small current flowing through the switching transistor on the lagging leg, in order that the switching transistor on the lagging leg achieves soft-switching turn-off, so as to reduce the loss, improve the anti-interference ability of the switching transistor, and improve the EMS performance of the switching transistor.

BRIEF DESCRIPTION OF THE DRAWINGS

In order to illustrate technical solutions in embodiments of the present disclosure more clearly, drawings to be used in the description of the embodiments or the conventional technology are introduced simply hereinafter. It is apparent that the drawings described below show only some embodiments of the present disclosure, and other drawings may be obtained by those skilled in the art based on the provided drawings without any creative effort.

DETAILED DESCRIPTION

The core of the present disclosure is to provide a method and device for controlling a switching transistor, and a DC-DC converter, which ensures a small current flowing through the switching transistor on the lagging leg, in order that the switching transistor on the lagging leg achieves soft-switching turn-off, reduce the loss, improve the anti-interference ability of the switching transistor, and improve the EMS performance of the switching transistor.

In order to make objectives, technical solutions and advantages of the present disclosure clearer, the technical solutions in the embodiments of the present disclosure are further described clearly and completely with reference to the drawings in the embodiments of the present disclosure hereinafter. It is apparent that the described embodiments are only some, rather than all, embodiments of the present disclosure. Any other embodiments obtained by those skilled in the art based on the embodiments in the present disclosure without any creative effort shall fall within the protection scope of the present disclosure.

Figure 2:
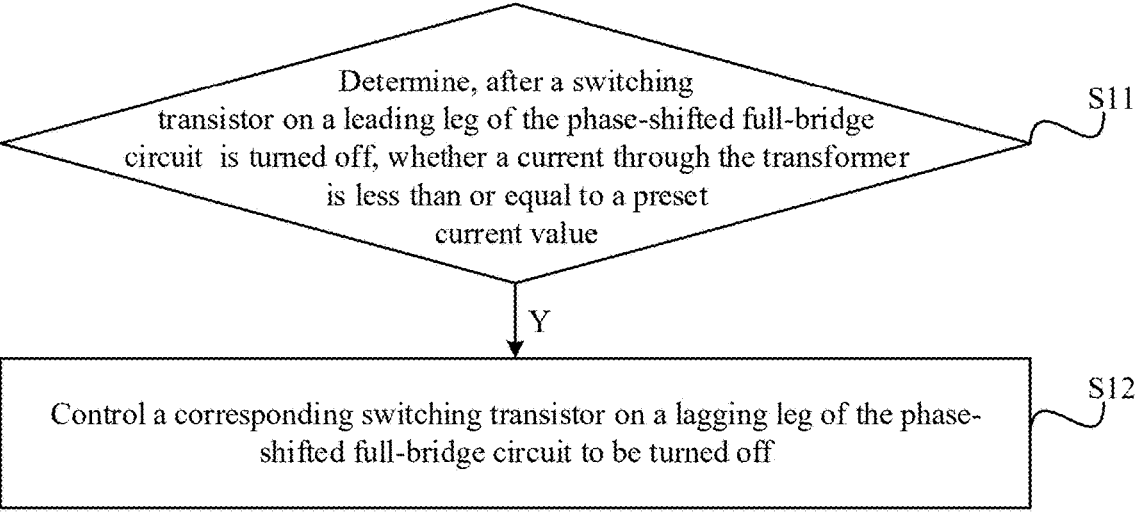
FIG. 2 is a schematic flowchart of a method for controlling a switching transistor according to the present disclosure.

Reference is made to FIG. 2, which is a schematic flowchart of a method for controlling a switching transistor according to the present disclosure.

The method is applicable to a DC-DC converter. The DC-DC converter includes a direct-current power supply, a phase-shifted full-bridge circuit, a transformer T, and a rectifier circuit provided with an LC resonant circuit. The method includes following steps S11 and S12.

In step S11, whether a current through the transformer T is less than or equal to a preset current value is determined after a switching transistor on a leading leg of the phase-shifted full-bridge circuit is turned off. Based on determination that the current through the transformer T is less than or equal to the preset current value, S12 is performed.

Figure 1:
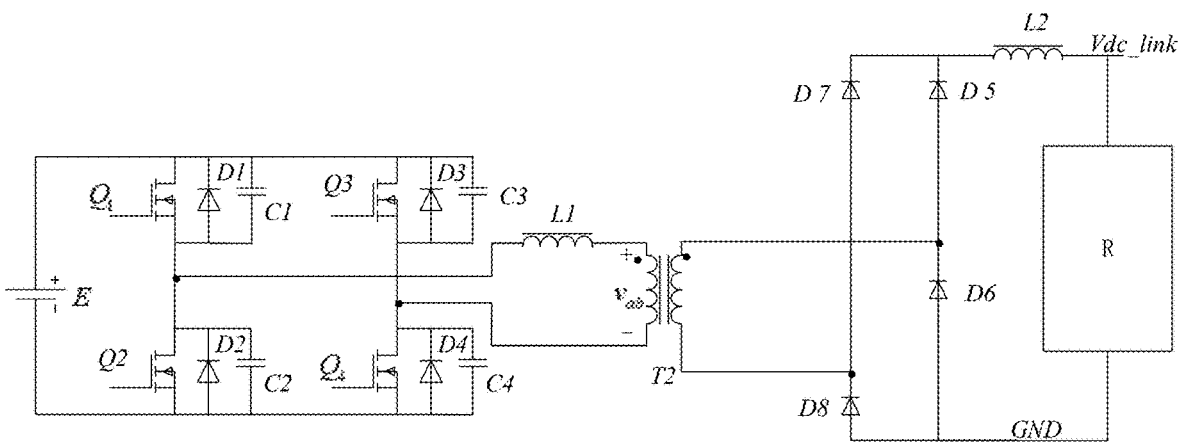
FIG. 1 is a schematic structural diagram of a DC-DC converter in the conventional technology.

The DC-DC converter in the conventional technology includes a direct-current power supply E, a phase-shifted full-bridge circuit, a transformer T and a rectifier circuit. However, as shown in FIG. 1, the rectifier circuit in the DC-DC converter in the conventional technology has four diodes D5, D6, D7 and D8 and an output filter inductor L2. When the current through the primary side of the transformer T undershoots from a positive direction to a negative direction, or from the negative direction to the positive direction, the current through the output filter inductor L2 cannot be abruptly changed, and the follow-on current through the output filter inductor L2 cooperative with the diode causes short-circuit of the transformer T. Specifically, the output filter inductor L2, the load, the diode D5 and the diode D6 form a loop, or the output filter inductor L2, the load, the diode D7 and the diode D8 form a loop, so that the voltage across the secondary side of the transformer T is 0, and the voltage across the primary side of the transformer T is 0. The voltage outputted by the direct-current power supply E is completely applied to the resonant inductance L1 of the primary side of the transformer T, causing a loss of the output duty cycle of the transformer T, such that the power demand of the load cannot be met.

Figure 3:
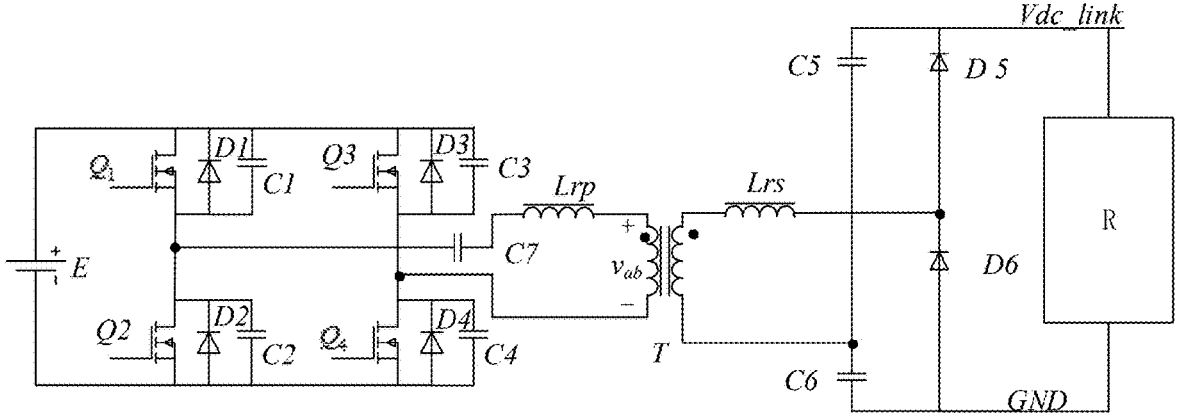
FIG. 3 is a schematic structural diagram of a DC-DC converter according to an embodiment of the present disclosure.
Figure 4:
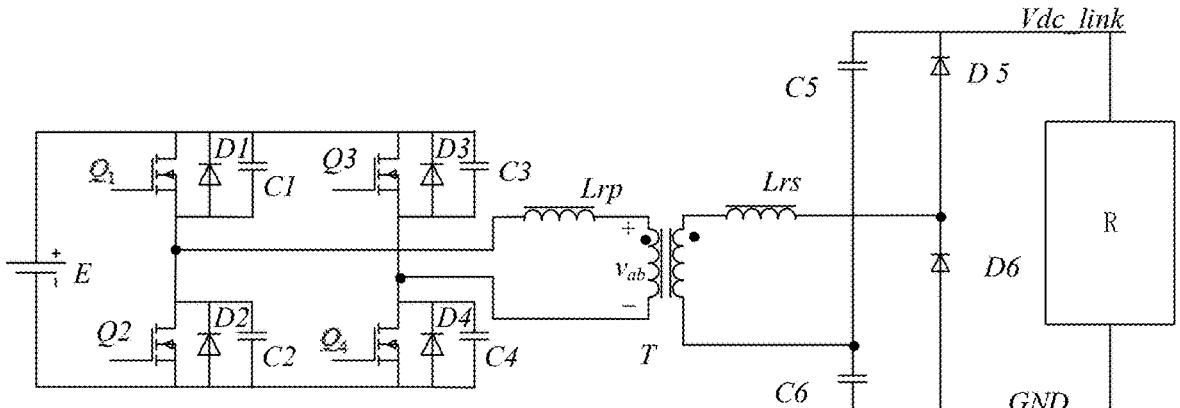
FIG. 4 is a schematic structural diagram of a DC-DC converter according to another embodiment the present disclosure.

In order to solve the above problems, the rectifier circuit in the present disclosure is provided with an LC resonant circuit, as shown in FIG. 3, which is a schematic structural diagram of a DC-DC converter according to an embodiment of the present disclosure. The resonant inductor Lrs on the secondary side resonates, and the resonant capacitors C5 and C6 on the secondary side store energy and discharge when the direction of the current through the transformer T changes, to ensure that the transformer T outputs power to the load normally, avoid the loss of the output duty cycle of the transformer T, and ensure that the voltage across the secondary side of the transformer T is not 0, so as facilitate subsequent control of the switching transistor in the phase-shifted full-bridge circuit. Since the resonant inductor Lrp and the capacitors connected in parallel at both terminals of each switching transistor of the primary side are capable of resonating, the resonant capacitor C7 of the primary side in FIG. 3 may be removed in order to save cost. Reference is made to FIG. 4, which is a schematic structural diagram of a DC-DC converter according to another embodiment of the present disclosure.

Figure 5:
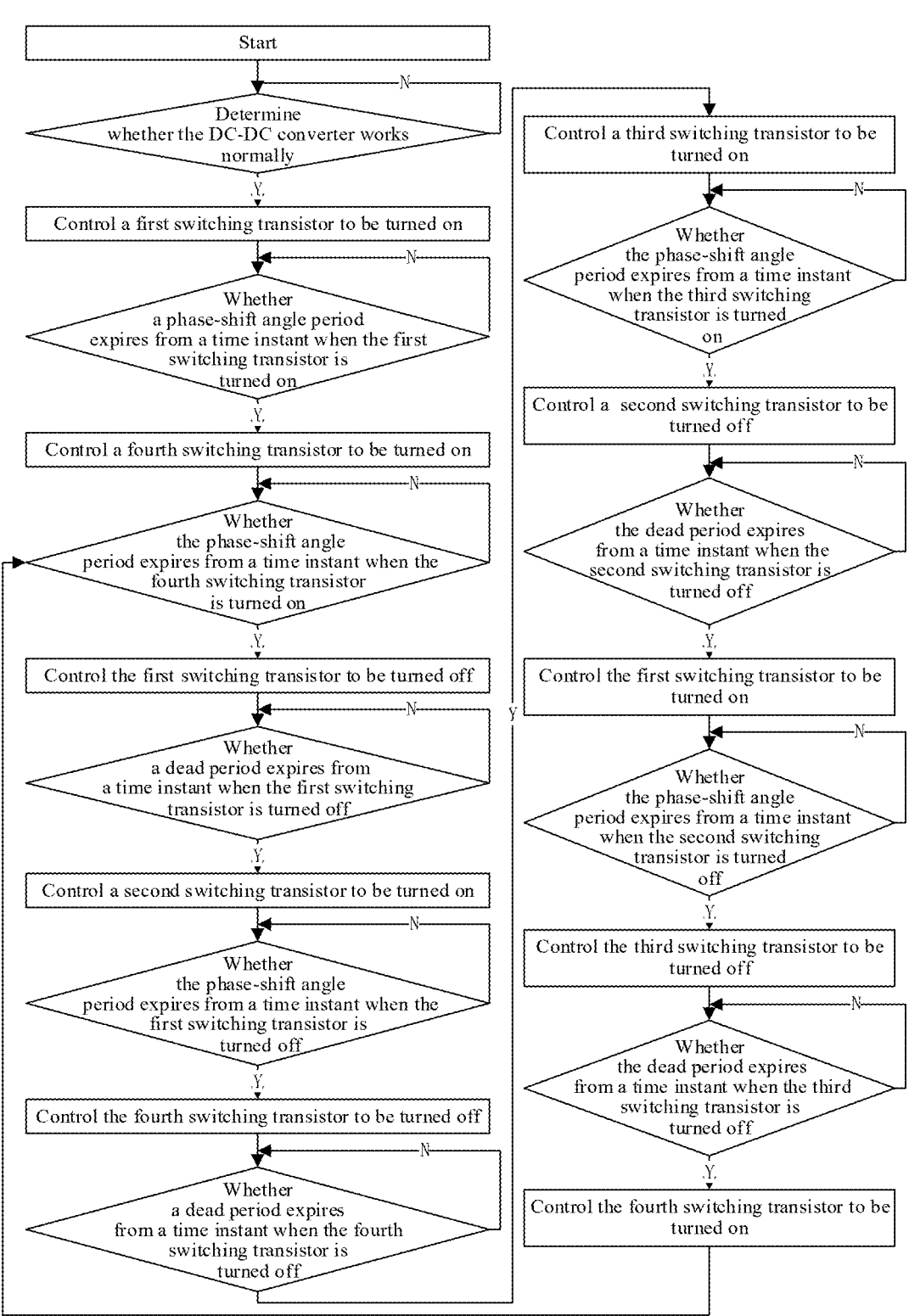
FIG. 5 is a flowchart of controlling switching transistors in the phase-shifted full-bridge circuit to be turned on and to be turned off in the conventional technology.

In the conventional technology, when switching transistors in the phase-shifted full-bridge circuit are controlled, two switching transistors on the same leg are usually controlled to be turned on alternatively. Specifically, the process of turning on and turning off respective switching transistors is shown in FIG. 5, which is a flowchart of controlling the switching transistors in the phase-shifted full-bridge circuit to be turned on and turned offs in the conventional technology. It can be seen that the actions of two switching transistors in the same leg are separated by the dead time. That is, the first switching transistor Q1 is turned off, and after the elapse of the dead time, the second switching transistor Q2 is turned on; the second switching transistor Q2 is turned off, and after the elapse of the dead time, the first switching transistor Q1 is turned on; the third switching transistor Q3 is turned off, and after the elapse of the dead time, the fourth switching transistor Q4 is turned on; the fourth switching transistor Q4 is turned off, and after the elapse of the dead time, the third switching transistor Q3 is turned on. The on-time and off-time of the two switching transistors on different legs in different lines are separated by the phase-shift angle time. That is, the first switching transistor Q1 is turned on, and after the elapse of the phase-shift angle time, the fourth switching transistor Q4 is turned on; the first switching transistor Q1 is turned off, and after the elapse of the phase-shift angle time, the fourth switching transistor Q4 is turned off; the second switching transistor Q2 is turned on, and after the elapse of the phase-shift angle time, the third switching transistor Q3 is turned on; and the second switching transistor Q2 is turned off, and after the elapse of the phase-shift angle time, the third switching transistor Q3 is turned off. The leg including the first switching transistor Q1 and the second switching transistor Q2 is the leading leg, and the leg including the third switching transistor Q3 and the fourth switching transistor Q4 is the lagging leg. Since the primary side of the transformer T is provided with the primary side resonant capacitor C7 and the primary side resonant inductor L1, as shown in FIG. 1, it is ensured that the first switching transistor Q1 and the second switching transistor Q2 on the leading leg can realize zero-voltage turn-on or zero-voltage turn-off, that is, when the voltage across the first switching transistor Q1 or the second switching transistor Q2 meets the zero voltage switching condition, the first switching transistor Q1 or the second switching transistor Q2 is turned on or turned off. However, the phase-shift angle time is preset and unchanged, and the switching transistor on the lagging leg is controlled to be turned on or turned off at the expiry of the phase-shift angle time. However, if the current flowing through the switching transistor is large at this time, for example, when the DC-DC converter is lightly loaded, the energy stored in the primary resonant inductance L1 at the primary side of the transformer T cannot completely drain the charge of the drain-source capacitance of the switching transistor on the lagging leg, resulting in a higher current flowing through the switching transistor and leading to a larger loss of the switching transistor when the switching transistor is turned off, that is, the switching transistor on the lagging leg works in the hard switching state, in which the switch transistor has poor EMC performance and low anti-interference capacity.

In order to solve the above problems, the present disclosure provides controlling the switching transistor by determining whether the current through the transformer T is less than or equal to the preset current value after the switching transistor on the leading leg of the phase-shifted full-bridge converter is turned off, instead of based on only the phase-shift angle time. In addition, the method for determining whether the current through the transformer T is less than or equal to the preset current value is not limited in the present disclosure.

In step S12, a corresponding switching transistor on a lagging leg of the phase-shifted full-bridge circuit is controlled to be turned off.

By controlling the switching transistor on the lagging leg to be turned off when the current through the transformer T is less than or equal to the preset current value, it is ensured that the switching transistor on the lagging leg is turned off while the current flowing through the switching transistor on the lagging leg is small, so as to the switching transistor on the lagging leg achieves soft-switching turn-off, so as to reduce the loss of the switching transistor.

In an embodiment, when the first switching transistor Q1 is turned off and the current flowing through the fourth switching transistor Q4 is small, the fourth switching transistor Q4 is controlled to be turned off, and when the second switching transistor Q2 is turned off and the current flowing through the third switching transistor Q3 is small, the third switching transistor Q3 is controlled to be turned off.

In addition, in the present disclosure, when the current through the transformer T is less than the preset current value, the switching transistor on the lagging leg is turned off, and the current through the transformer T changes direction accordingly, increasing or decreasing from 0. Therefore, it is also ensured that the rectifier diode in the rectifier circuit of the secondary side of the transformer T is turned off softly, so as to reduce the loss of the rectifier diode, improve the efficiency, and improve the EMS performance of the rectifier diode.

In an embodiment, the phase-shift angle time may be determined according to the expected output power of the DC-DC converter, so that at expiry of the phase-shift angle time, the current through the switching transistor on the lagging leg also allows for soft-switching turn-off. Alternatively, the switching transistor is controlled according to the relationship between the current through the transformer T and the current preset value, so as to achieve variable frequency control, and reduce the switching frequency of the switching transistor at low power, which not only facilitates the soft switching control, but also reduces switching loss, and further achieves better efficiency and EMC performance at low power. The dual-resonance phase-shifted full-bridge control of the primary side and the secondary side can effectively utilize the two resonance points of the primary side and the secondary side of the transformer T, so as to control the switching transistor based on the optimal resonant frequency and realize the optimal soft switching control.

Figure 6:
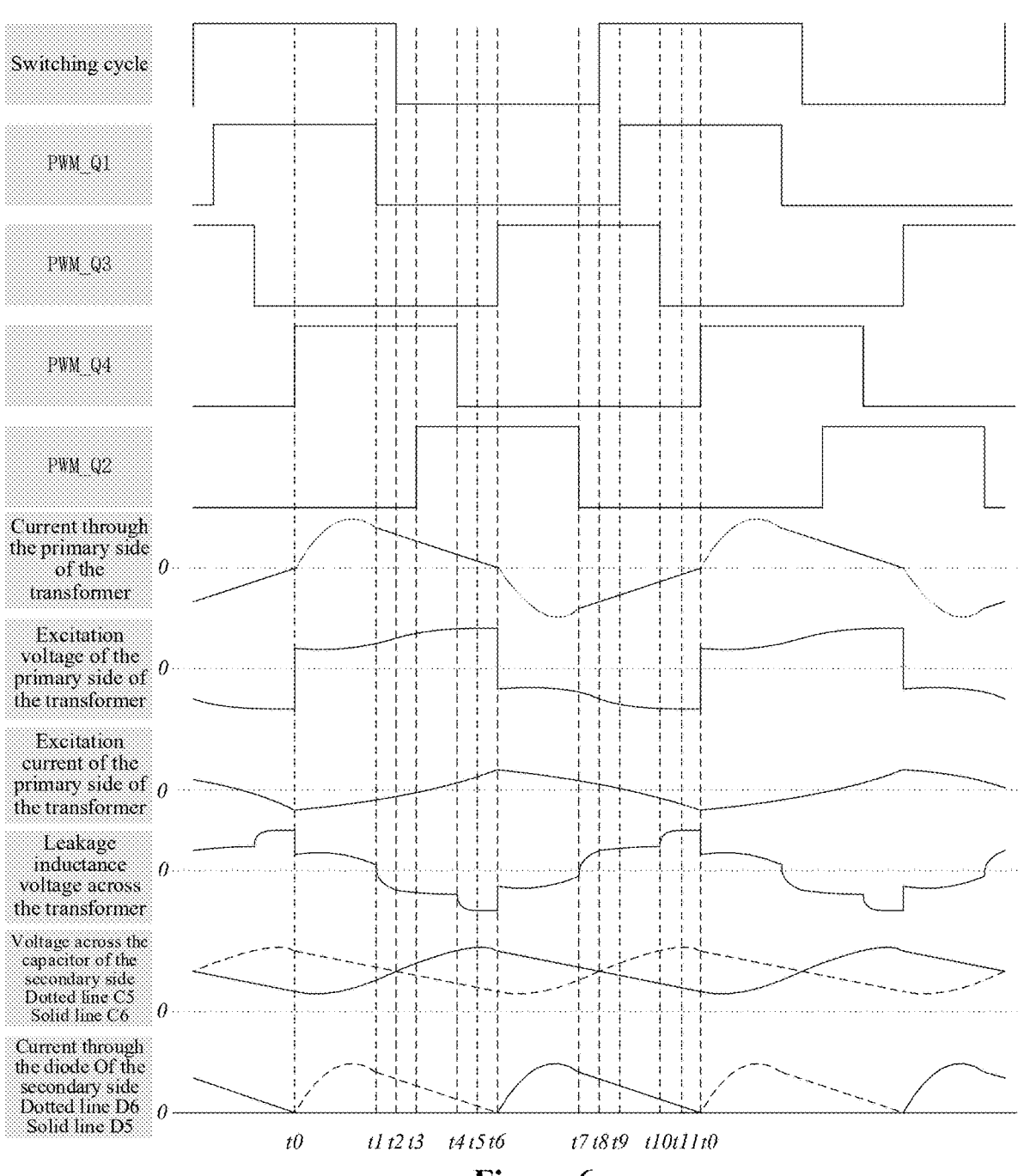
FIG. 6 is a waveform diagram of key parameters in a DC-DC converter according to the present disclosure.

The turn-on and turn-off process of each switching transistor and the waveform diagram of each current is shown in FIG. 6, which is a waveform diagram of key parameters in a DC-DC converter according to the present disclosure. FIG. 6 shows drive signals PWM_Q1 to PWM_Q4 of respective switching transistors in the phase-shifted full-bridge circuit, the current through the primary side of the transformer T, the excitation voltage across the primary side of the transformer T, the excitation current through the primary side of the transformer T, the leakage inductance voltage of the transformer T, and the voltage across the capacitor of the secondary side and the current through the rectifier diode of the secondary side. The switching cycle in FIG. 6 begins at the time instant when the first switching transistor Q1 is turned on and ends at the time instant when the first switching transistor Q1 is turned on for a next cycle. The control cycle of the four switching transistors includes 12 time periods, namely t0-t1, t1-t2, t2-t3, t3-t4, t4-t5, t5-t6, t6-t7, t7-t8, t8-t9, t9-t10, t10-t11 and t11-t0.

During the time period from t0 to t1, the first switching transistor Q1 and the fourth switching transistor Q4 are both in the on-state; the excitation current through the primary side of the transformer T decreases in the negative direction firstly and then increases in the positive direction; the current through the primary side of the transformer T gradually increases from 0; the second resonant capacitor C6 of the secondary side of the transformer T serves as a charging capacitor at this time, and the voltage across the second resonant capacitor C6 gradually increases; the first resonant capacitor C5 discharges, and the voltage across the first resonant capacitor C5 gradually decreases; the second diode D6 is turned on, and the current through the second diode D6 first increases and then gradually decreases.

During the time period from t1 to t2, at the time instant t1, the first switching transistor Q1 is turned off and the fourth switching transistor Q4 is turned on; the first capacitor C1 connected in parallel to both terminals of the first switching transistor Q1 is charged, and the second capacitor C2 connected in parallel to both terminals of the second switching transistor Q2 is discharged; the excitation current through the primary side of the transformer T increases slowly in the positive direction; the current through the primary side begins to decrease; the second resonant capacitor C6 of the secondary side of the transformer T serves as a charging capacitor, and the voltage across the second resonant capacitor C6 continues to increase gradually; the first resonant capacitor C5 discharges, and the voltage across the first resonant capacitor C5 decreases gradually; and the second diode D6 outputs a current decreasing gradually.

During the time period from t2 to t3, the first switching transistor Q1 is turned off, and the fourth switching transistor Q4 is maintained in the on-state; when the first capacitor C1 connected in parallel to both terminals of the first switching transistor Q1 of the primary side is fully charged, and the second capacitor C2 connected in parallel to both terminals of the second switching transistor Q2 is fully discharged, that is, VC1=Vin, the body diode D2 of the second capacitor C2 is turned on by the follow-on current, which creates conditions for the zero-voltage turn-on of the second switching transistor Q2; the excitation current through the primary side of the transformer T increases slowly in the positive direction, the current through the primary side continues to decrease; the second resonant capacitor C6 of the secondary side is still the charging capacitor, and the voltage across the second resonant capacitor C6 increases slowly; the first resonant capacitor C5 continues to discharge, and the voltage across the resonant capacitor C5 decreases gradually; and the second diode D6 outputs a current decreasing gradually.

During the time period from t3 to t4, the second switching transistor Q2 is turned on at the time instant t3, and the fourth switching transistor Q4 is still in the on-state; the time period from t1 to t3 is the dead period between the first switching transistor Q1 and the second switching transistor Q2; the second switching transistor Q2 is turned on at zero voltage, the excitation current through the primary side of the transformer T increases slowly in the positive direction, the current through the primary side continues to decrease; the resonant capacitor C6 of the secondary side second is still the charging capacitor, and the voltage across the second resonant capacitor C6 increases slowly; the first resonant capacitor C5 continues to discharge, and the voltage across the first resonant capacitor C5 gradually decreases; and the second diode D6 outputs a current decreasing gradually.

During the time period from t4 to t5, the fourth switching transistor Q4 is turned off at the time instant t4, the second switching transistor Q2 is maintained in the on-state, and the fourth switching transistor Q4 is turned off at zero voltage (the voltage across the fourth switching transistor Q4 starts to rise from 0, at the same time, the current through the transformer T is close to 0, that is, less than the preset current value, and the fourth switching transistor Q4 is turned off at approximately zero current). During this process, the fourth capacitor C4 connected in parallel to both terminals of the fourth switching transistor Q4 is charged, the third capacitor C3 connected in parallel to both terminals of the third switching transistor Q3 is discharged; the excitation current through the primary side of the transformer T increases slowly in the positive direction, the current through the primary side continues to decrease; the second resonant capacitor C6 of the secondary side is still the charging capacitor, the voltage across the second resonant capacitor C6 increases slowly; the first resonant capacitor C5 continues to discharge, the voltage across the first resonant capacitor C5 gradually decreases; and the second diode D6 outputs a current decreasing gradually.

During the time period from t5 to t6, the second switching transistor Q2 is in the on-state, and the fourth switching transistor Q4 is in the off-state; the excitation current through the primary side of the transformer T increases slowly in the positive direction, and the current through the primary side continues to decrease to approximately 0; the fourth capacitor C4 connected in parallel to both terminals of the fourth switching transistor Q4 is fully charged, that is, VC4=Vin; the third capacitor C3 connected in parallel to both terminals of the third switching transistor Q3 is fully discharged; when the voltage across the third capacitor C3 connected in parallel to both terminals of the third switching transistor Q3 is 0, the body diode D3 of the third switching transistor Q3 is turned on, which creates conditions for the third switching transistor Q3 to realize zero-voltage turn-on; the second resonant capacitor C6 of the secondary side is still the charging capacitor, and the voltage across the second resonant capacitor C6 increases slowly; the first resonant capacitor C5 continues to discharge, and the voltage across the first resonant capacitor C5 gradually decreases; and the second diode D6 outputs a current that gradually decreases to 0.

During the time period from t6 to t7, the second switching transistor Q2 and the third switching transistor Q3 are both in the on-state; the excitation current through the primary side of the transformer T first decreases in the positive direction and then increases in the negative direction (the downward direction is defined as the positive direction of the excitation current); the current through the primary side increases in the negative direction; the first resonant capacitor C5 of the secondary side is a charging capacitor, and the voltage across the first resonant capacitor C5 gradually increases; the second resonant capacitor C6 discharges, and the voltage across the second resonant capacitor C6 gradually decreases; and the first diode D5 outputs a current decreasing gradually.

During the time period from t7 to t8, the second switching transistor Q2 is turned off at the time instant t7; the third switching transistor Q3 is in the on-state; the second capacitor C2 connected in parallel to both terminals of the second switching transistor Q2 is charged, and the first capacitor C1 connected in parallel to both terminals of the first switching transistor Q1 is discharged; the current through the primary side of the transformer T increases slowly in the negative direction, and the excitation current of the primary side begins to decrease in the negative direction; the first resonant capacitor C5 of the secondary side of the transformer T serves as a charging capacitor, and the voltage across the first resonant capacitor C5 continues to increase gradually; the second resonant capacitor C6 discharges, and the voltage across the second resonant capacitor C6 gradually decreases; and the first diode D5 outputs a current decreasing gradually.

During the time period from t8 to t9, the second switching transistor Q2 is in the off-state, and the third switching transistor Q3 is maintained in the on-state; when the second capacitor C2 connected in parallel to both terminals of the second switching transistor Q2 of the primary side is fully charged, and the first capacitor C1 connected in parallel to both terminals of the first switching transistor Q1 is fully discharged, that is, VC2=Vin, the body diode D1 of the first capacitor C1 is turned on by the follow-on current, which creates conditions for the zero-voltage turn-on of the first switching transistor Q1; the excitation current through the primary side of the transformer T increases slowly in the negative direction, and the current through the primary side continues to decrease in the negative direction; the first resonant capacitor C5 of the secondary side is still a charging capacitor, and the voltage across the first resonant capacitor C5 increases slowly; the second resonant capacitor C6 continues to discharge, and the voltage across the second resonant capacitor C6 gradually decreases; and the first diode D5 outputs a current decreasing gradually.

During the time period from t9 to t10, the first switching transistor Q1 is turned on and is maintained in the on-state, and the third switching transistor Q3 is in the on-state; the excitation current through the primary side of the transformer T increases in the negative direction; since the body diode D1 of the switching transistor Q1 is turned on by the follow-on current, and the first switching transistor Q1 is turned on at zero voltage, the excitation current increases slowly in the negative direction, and the current through the primary side continues to decrease in the negative direction; the first resonant capacitor C5 of the secondary side is still the charging capacitor, and the voltage across the first resonant capacitor C5 increases slowly; the second resonant capacitor C6 discharges, and the voltage across the second resonant capacitor C6 gradually decreases; and the first diode D5 outputs a current decreasing gradually.

During the time period from t10 to t11, the third switching transistor Q3 is turned off at the time instant t10, the first switching transistor Q1 is maintained in the on-state, where the third switching transistor Q3 realizes zero-voltage turn-off (the voltage across the third switching transistor Q3 starts to rise from 0, at the same time, the current through the transformer T is also approximately to 0, that is, the current through the transformer T is less than the preset current value, then the third switching transistor Q3 is turned off at approximately zero current); the fourth capacitor C4 connected in parallel to both terminals of the fourth switching transistor Q4 discharges, and the third capacitor C3 connected in parallel to both terminals of the third switching transistor Q3 is charged; the excitation current through the primary side of the transformer T increases slowly in the negative direction, and the current through the primary side continues to decrease in the negative direction; the first resonant capacitor C5 of the secondary side is still the charging capacitor, and the voltage across the first resonant capacitor C5 increases slowly; the second resonant capacitor C6 continues to discharge, and the voltage across the second resonant capacitor C6 gradually decreases; and the first diode outputs a current decreasing gradually.

During the time period from t11 to t0, the first switching transistor Q1 is in the on-state, and the third switching transistor Q3 is in the off-state; the excitation current through the primary side of the transformer T increases slowly in the negative direction, and the current through the primary side continues to decrease to approximately 0; the third capacitor C3 connected in parallel to both terminals of the third switching transistor Q3 is fully charged, that is, VC3=Vin, and the fourth capacitor C4 connected in parallel to both terminals of the fourth switching transistor Q4 is fully discharged; when the voltage across the fourth capacitor C4 connected in parallel to both terminals of the fourth switching transistor Q4 is 0, the body diode D4 of the fourth switching transistor Q4 is turned on, which creates conditions for the fourth switching transistor Q4 to achieve zero-voltage turn-on; the first resonant capacitor C5 of the secondary side is still the charging capacitor, and the voltage across the first resonant capacitor C5 increases slowly; the second resonant capacitor C6 continues to discharge, and the voltage across the second resonant capacitor C6 gradually decreases; and the current of the main power gradually decreases to zero, the charging of the first resonant capacitor C5 and the discharge of the second resonance capacitor C6 are gradually completed.

It should be noted that, for each of the switching transistors in the phase-shifted full-bridge circuit in the present disclosure, the capacitor and the diode connected in parallel to both terminals of the switching transistor may be the junction capacitor and the body diode of the switching transistor itself, which is not limited in the present disclosure.

In summary, by controlling the switching transistor on the lagging leg of the phase-shifted full-bridge converter to be turned off after the corresponding switching transistor on the leading leg is turned off and when the current through the transformer is not greater than the preset current value, a small current through the switching transistor on the lagging leg is ensured, in order that the switching transistor on the lagging leg achieves soft-switching turn-off, so as to reduce the loss, improve the anti-interference ability of the switching transistor, and improve the EMS performance of the switching transistor.

On the basis of the above-mentioned embodiment, in an embodiment, the DC-DC converter further includes a current transformer CT, an integrator circuit, an amplifier U1 and a comparator connected in sequence. An input terminal of the current transformer CT is connected to the transformer T, and the current transformer CT is configured to collect a current through the transformer T. The integrator circuit is configured to integrate the current through the transformer T to obtain a voltage signal. The amplifier is provided with a bias voltage Vref at a positive input terminal, and is configured to amplify the voltage signal while adding the bias voltage Vref, and output the amplified voltage signal. The comparator is configured to compare the amplified voltage signal with a maximum integration threshold and a minimum integration threshold, output a first level based on determination that the amplified voltage signal is greater than the maximum integration threshold or less than the minimum integration threshold, and output a second level based on determination that the amplified voltage signal is less than the maximum integration threshold and greater than the minimum integration threshold, where the first level is opposite to the second level.

The determining whether the current through the transformer T is less than or equal to the preset current value after the switching transistor on the leading leg of a phase-shifted full-bridge converter is turned off includes:

controlling the integrator circuit to integrate the current through the transformer T collected by the current transformer CT within an integration period, to obtain the voltage signal; where the integration period starts from an integration starting time instant at which the switching transistor on the lagging leg of the phase-shifted full-bridge converter is turned on, and ends at an integration ending time instant at which the comparator begins outputting the second level.

determining a phase-shift angle period based on the integration period and a resonance parameter of the LC resonant circuit;

determining whether the phase-shift angle period expires from a time instant at which the switching transistor on the leading leg of the phase shifted full-bridge converter is turned off, while determining whether the current through the transformer T is less than or equal to the preset current value; and controlling the corresponding switching transistor on the lagging leg of the phase-shifted full-bridge converter to be turned off based on determination that the current through the transformer is less than or equal to the preset current value before the expiry of the phase-shift angle period.

In this embodiment, the phase-shift angle period is calculated for determining whether the current through the transformer T is less than the preset current value, so as to ensure that the current through the transformer T is less than the preset current value after the switching transistor on the leading leg is turned off and before elapse of the phase-shift angle period. The phase-shift angle period in the embodiments of the present disclosure is not fixed, but is calculated in a real-time manner based on the current through the transformer T.

In an embodiment, a voltage threshold Vpc is set based on the preset current value, and a maximum integration threshold and a minimum integration threshold are obtained by using the voltage threshold Vpc and the bias voltage Vref. The maximum integration threshold Vth1=bias voltage (Vref)+voltage threshold (Vpc), and the minimum integration threshold Vth2=bias voltage Vref−voltage threshold Vpc. The integrator circuit integrates the current through the transformer T from the time instant at which the switching transistor on the lagging leg is turned on, which is also the time instant at which the switching transistor on the leading leg and the corresponding switching transistor on the lagging leg are simultaneously turned on. The amplifier U1 amplifies the voltage value obtained by the integrator circuit performing integration and to which the bias voltage Vref is added, and the comparator compares the amplified voltage signal outputted by the amplifier U1 with the maximum integration threshold Vth1 and the minimum integration threshold Vth2. When the amplified voltage signal is greater than the maximum integration threshold or less than the minimum integration threshold, the first level is output.

Figure 7:
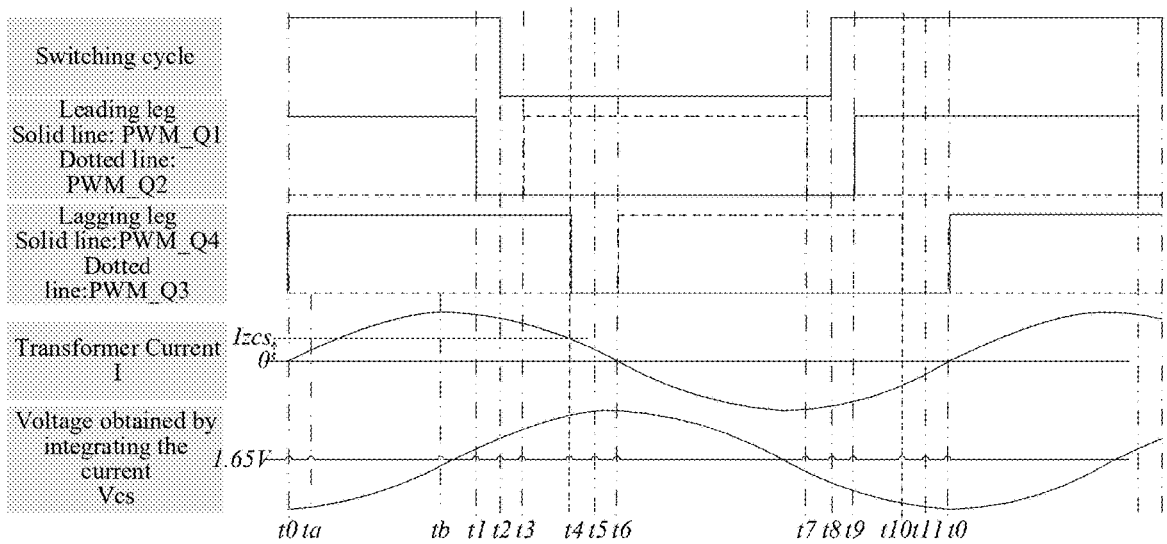
FIG. 7 is a waveform diagram related to a preset current value according to the present disclosure.
Figure 8:
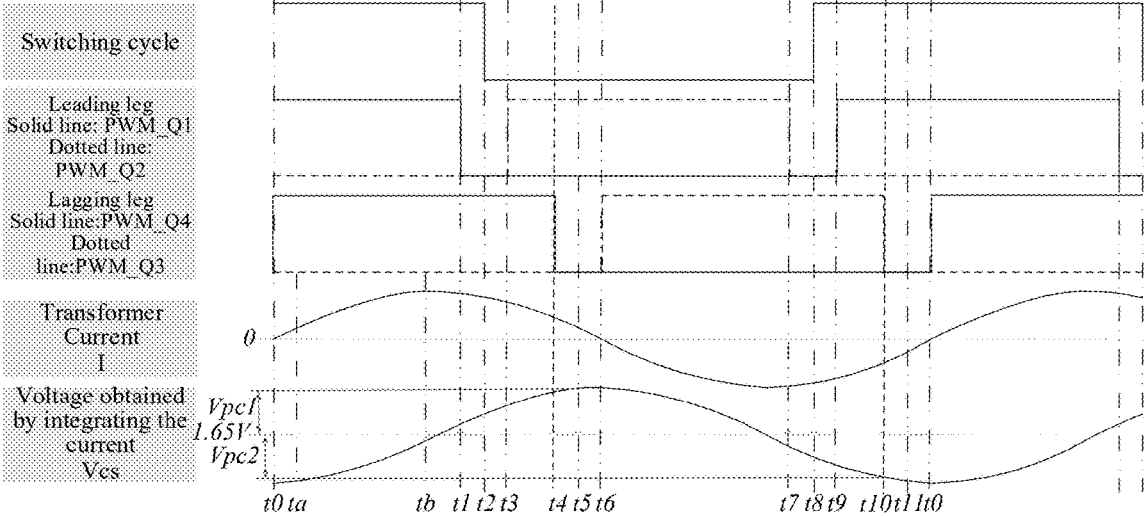
FIG. 8 is a waveform diagram related to the integration threshold according to the present disclosure.

When the amplified voltage signal is less than the maximum integration threshold and greater than the minimum integration threshold, the second level is output. The time instant at which the comparator begins to output the first level signal is determined as the integration ending time instant, so that the integration period is determined. It should be noted that the voltage threshold Vpc=func (I, a, R, T, Rc, C), where i is the current through the transformer T, a is the proportional coefficient of the current transformer CT, and R is the resistance of the current transformer CT, Rc is the resistance in the integrator circuit, C is the capacitance in the integrator circuit, and T is the integration period calculated above. Referring to FIG. 7, which is a waveform diagram related to a preset current value according to the present disclosure, Izcs is the preset current value, and the time period between t0 and t4 is the integration period. Referring to FIG. 8, which is a waveform diagram related to the integration threshold according to the present disclosure, Vpc1 is the maximum integration threshold, Vpc2 is the minimum integration threshold, and the bias voltage Vref is 1.65V After the integration time T is calculated, the phase-shift angle period is determined based on the integration period T and the resonance parameters of the LC resonant circuit. In an embodiment, the phase-shift angle period Tps=Ts/2−T, where Ts is the switching cycle, and the angular resonance frequency w is determined based on the resonance parameters of the LC resonant circuit.

To sum up, by setting the voltage threshold Vpc corresponding to the preset current value, the phase-shift angle period is calculated, so that the switching transistor on the lagging leg is turned off after the corresponding switching transistor on the leading leg is turned off and before the expiry of the phase-shift angle period is reached and, thereby realizing the soft-switching turn-off of the switching transistor on the lagging leg.

In an embodiment, after the determining a phase-shift angle period based on the integration period and a resonance parameter of the LC resonant circuit, the method further includes:

determining a maximum phase-shift angle period;

determining whether the phase-shift angle period is less than the maximum phase-shift angle period;

proceeding to the step of determining whether the phase-shift angle period expires from a time instant at which the switching transistor on the leading leg of the phase shifted full-bridge converter is turned off, based on determination that the phase-shift angle period is less than the maximum phase-shift angle period;

determining whether the maximum phase-shift angle period expires from the time instant at which the switching transistor on the leading leg of the phase shifted full-bridge converter is turned off, based on determination that the phase-shift angle time is greater than or equal to the maximum phase-shift angle time; and proceeding to the step of controlling a corresponding switching transistor on a lagging leg of the phase-shifted full-bridge converter to be turned off, based on determination that the maximum phase-shift angle time expires.

Figure 9:
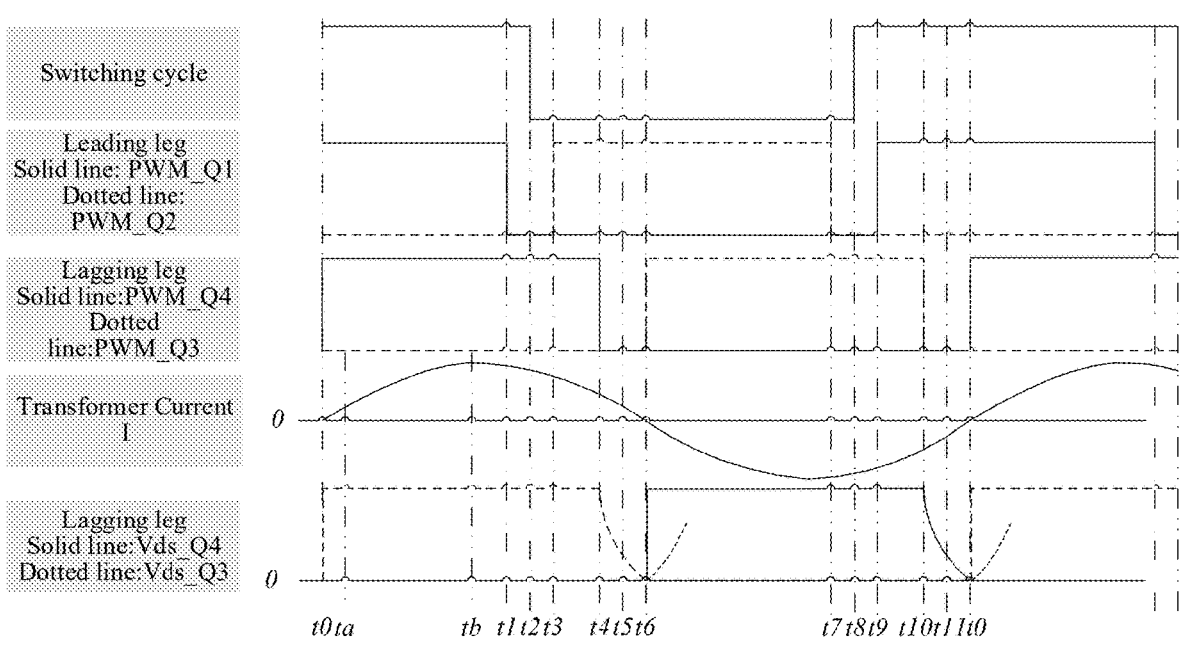
FIG. 9 is a waveform diagram of a voltage across the switching transistor according to the present disclosure.

Reference is made to FIG. 9, which is a waveform diagram of a voltage across the switching transistor according to the present disclosure. In an embodiment, the applicant considers that at the time instant t4 in FIG. 9, the fourth switching transistor Q4 on the lagging leg is turned off at zero current, that is, ZCS (Zero Current Switch) is realized, and at the time instant t6, the third switching transistor Q3 on the lagging leg is turned on at zero voltage, that is, ZVS (Zero Voltage Switch) is realized. At the time instant t6, the voltage Vds_Q3 across the third switching transistor Q3 is at the minimum value, and the third switching transistor Q3 is turned on to realize ZVS. When the ZCS point is very close to the ZVS point, the realization of the ZVS is affected. The present disclosure proposes a variable phase-shift angle time Tps to eliminate the influence of the ZCS on the ZVS, and the phase-shift angle period Tps is less than a threshold, that is, less than the maximum phase-shift angle period Tpsmax. The maximum phase-shift angle time Tpsmax is calculated according to the formula Tpsmax=func (w, Uc, Jo, n, C, Lr, tonv), where the angular resonance frequency w is determined based on the resonance parameter of the LC resonant circuit, Uc is the input voltage of the DC-DC converter, Jo is the current through the transformer T, n is the turns ratio between the primary and secondary sides of the transformer T, and C is the junction capacitor of each switching transistor in the phase-shifted full-bridge circuit or the capacitor connected in parallel to both terminals of each switching transistor, Lr is the leakage inductance parameter of the primary side of the transformer T, and tony is the time instant at which the switching transistor on the leading leg and the corresponding switching transistor on the lagging leg are simultaneously turned on. If the dead period, that is, the period between t4-t6 remains unchanged, when the phase-shift angle period Tps>Tpsmax, due to the small leakage inductance current of the primary side of the transformer T, the resonance energy is not enough, the voltage Vds_Q3 across the third switching transistor Q3 or the voltage Vds_Q4 across the fourth switching transistor Q4 may only resonate to t5, and the voltage across the switching transistor is too high, that is, ZVS cannot be achieved. Therefore, the maximum phase-shift angle period is a critical condition under which the switching transistor on the lagging leg achieves ZVS.

In order to solve the above technical problem, according to the present disclosure, after determining the phase-shift angle period, it is necessary to compare the phase-shift angle period with the maximum phase-shift angle period. When the phase-shift angle period is greater than the maximum phase-shift angle period, the maximum phase-shift angle period is used as the phase-shift angle period to control the switching transistor on the lagging leg; when the phase-shift angle period is less than the maximum phase-shift angle period, the phase-shift angle period is not changed, and is used to control the switching transistor on the lagging leg.

To sum up, the method in this embodiment not only enables the switching transistor on the lagging leg to realize ZCS, but also ensures that the switching transistor on the lagging leg realizes ZVS.

In an embodiment, determining a maximum phase-shift angle period includes:

determining the maximum phase-shift angle period based on: junction capacitances of respective switching transistors in the phase-shifted full-bridge circuit, a leakage inductance parameter of the primary side of the transformer, the resonance parameter of the LC resonant circuit, an output voltage of the transformer, an output current of the transformer and the integration period.

In this embodiment, the maximum phase-shift angle period may be calculated according to the formula Tpsmax=func (w, Uc, Io, n, C, Lr, tonv), where the angular resonance frequency w is determined based on the resonance parameter of the LC resonance circuit, Uc is the input voltage of the DC-DC converter, Io is the current through the transformer T, n is the turns ratio between the primary and secondary sides of the transformer T, C is the junction capacitor of each switch in the phase-shifted full-bridge circuit or the capacitor connected in parallel to both terminals of each switching transistor, Lr is the leakage inductance parameter of the primary side of the transformer T, and tony is the time instant when the switching transistor on the leading leg and the corresponding switching transistor on the lagging leg are simultaneously turned on. After the maximum phase-shift angle period is determined, the switching transistor on the lagging leg not only realizes ZCS, but also realizes ZVS.

In an embodiment, after controlling the corresponding switching transistor on the lagging leg in the phase-shifted full-bridge converter to be turned off, the method further includes:

determining whether a preset dead period expires from a time instant at which the corresponding switching transistor on the lagging leg of the phase-shifted full-bridge converter is turned off;

controlling another switching transistor on the lagging leg of the phase-shifted full-bridge converter to be turned on based on determination that the preset dead period expires.

In order to ensure that the switching transistors on the lagging leg are alternatively turned on, that is, the on-periods of the two switching transistors on the lagging leg do not overlap, after the switching transistor in the on-state is turned off, another switching transistor on the lagging leg is controlled to be turned on at the expiry of the preset dead period. That is, after the third switching transistor Q3 is turned off, the fourth switching transistor Q4 is controlled to be turned on at the expiry of the preset dead period, and after the fourth switching transistor Q4 is turned off, the third switching transistor Q3 is controlled to be turned on at the expiry of the preset dead period, so as to prevent the switching transistors on the lagging leg from being turned on at the same time and causing a short circuit, which causes abnormal operation of the DC-DC converter.

In addition, when the preset dead period is short, it is ensured that the switching transistors on the lagging leg do not cause follow-on current, that is, it is ensured that the switching transistors on the lagging leg work in a soft switching state.

In an embodiment, before the determining whether a preset dead period expires from a time instant at which the corresponding switching transistor on the lagging leg of the phase-shifted full-bridge converter is turned off, the method further includes:

determining an LC resonant period of the primary side of the transformer based on the junction capacitances of respective switching transistors in the phase-shifted full-bridge circuit and the leakage inductance parameter of the primary side of the transformer;

determining a maximum dead period based on the LC resonant period of the primary side of the transformer;

setting the preset dead time based on the maximum dead time, where the preset dead time is less than the maximum dead time; and proceeding to the step of determining whether a preset dead period expires from a time instant at which the corresponding switching transistor on the lagging leg of the phase-shifted full-bridge converter is turned off.

In this embodiment, the applicant considers that if the dead period Tdt is greater than the period between t4 and t6, at t6, it can be seen from FIG. 9 that, as shown by the dotted line, the voltage Vds_Q3 across the third switching transistor Q3 increases from 0, and the current through the transformer T also begins to increase in the negative direction, such that the switching transistor on the lagging leg is unable to realize ZVS.

In order to solve the above technical problems, in the present disclosure, before the dead period Tdt is set, the LC resonance period of the primary side of the transformer T is determined based on the junction capacitances of respective switching transistors on the lagging leg in the phase-shifted full-bridge circuit and the leakage inductance parameter of the primary side of the transformer T, to determine the maximum dead period Tdtmax. By ensuring that the dead period Tdt is less than the maximum dead period Tdtmax, the switching transistor on the lagging leg can realize ZVS.

In an embodiment, the DC-DC converter further includes a current transformer CT, an amplifier U1 and a comparator connected in sequence. An input terminal of the current transformer CT is connected to the transformer T and the current transformer CT is configured to collect a current through the transformer T. The amplifier U1 is configured to amplify the current through the transformer T collected by the current transformer CT and output an amplified current signal. The comparator is configured to compare the amplified current signal with a preset current value, output a third level based on determination that the amplified current signal is less than or equal to the preset current value, and output a fourth level based on determination that the amplified current signal is greater than the preset current value, where the third level is opposite to the fourth level.

The determining whether a current through the transformer T is less than or equal to a preset current value after a switching transistor on a leading leg of a phase-shifted full-bridge converter is turned off includes:

determining whether an output signal of the comparator is the third level after the switching transistor on the leading leg of the phase-shifted full-bridge converter is turned off; and proceeding to the step of controlling the corresponding switching transistor on the lagging leg of the phase-shifted full-bridge converter to be turned off based on determination that the output signal of the comparator is the third level.

In this embodiment, when determining whether the current through the transformer T is less than the preset current value, the current through the transformer T may be directly detected, and the amplified current signal is compared with the preset current value, and when the comparator outputs a third signal indicating that the current through the transformer T is less than the preset current, the switching transistor on the lagging leg is turned off, so that the switching transistor on the lagging leg realizes ZCS.

In an embodiment, before the determining whether a current through the transformer is less than or equal to a preset current value after a switching transistor on a leading leg of a phase-shifted full-bridge converter is turned off, the method further includes:

determining an expected value for the current through the transformer T based on a load connected to an output terminal of the DC-DC converter;

determining, after the corresponding switching transistor on the lagging leg is turned on, whether the current through the transformer T reaches the expected value;

controlling the switching transistor on the leading leg of the phase-shifted full-bridge converter to be turned off based on determination that the current through the transformer reaches the expected value; and proceeding to the step of the determining whether a current through the transformer is less than or equal to a preset current value after a switching transistor on a leading leg of a phase-shifted full-bridge converter is turned off.

Figure 10:
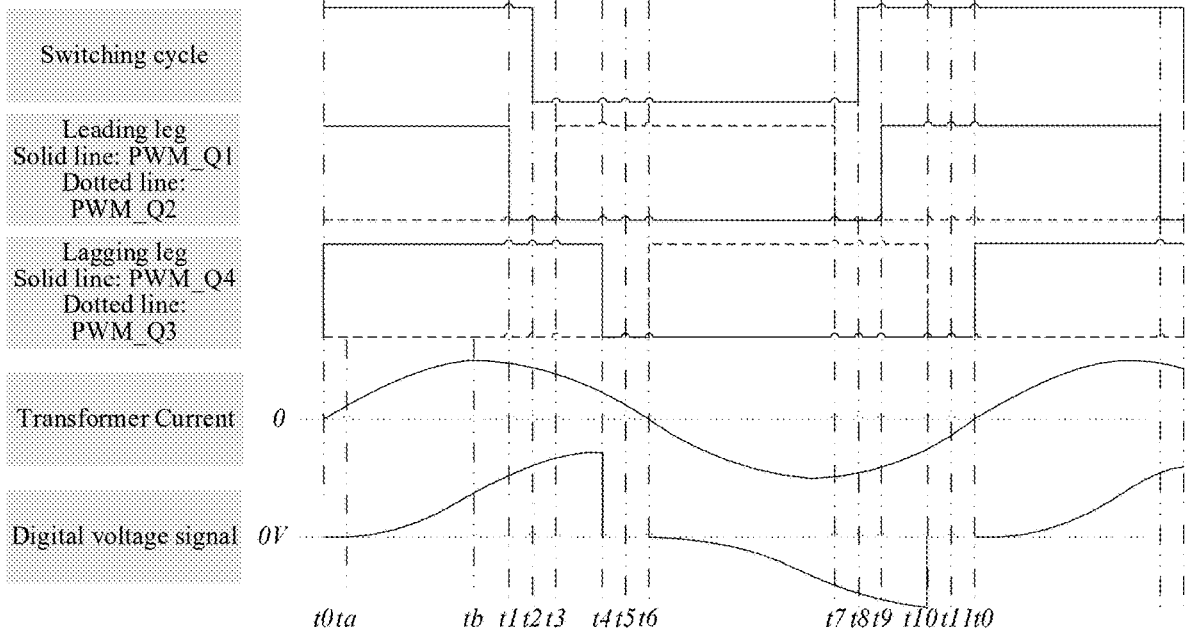
FIG. 10 is a waveform diagram of key parameters when the switching transistor in the leading leg is controlled in the conventional technology.
Figure 11:
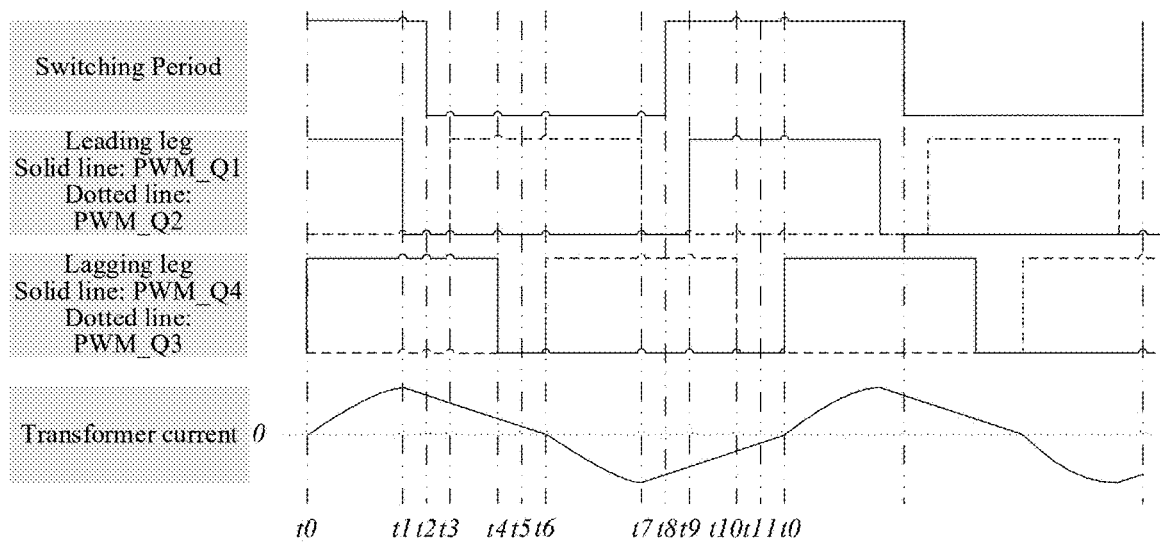
FIG. 11 is another waveform diagram of key parameters when the switching transistor in the leading leg is controlled in the conventional technology.

The applicant considers that in the conventional technology, the switching transistor on the leading leg of the phase-shifted full-bridge circuit is controlled to be turned off by setting a voltage threshold or directly by using a current. Specifically, in the conventional technology, a current transformer CT, an integrator circuit, an amplifier U1 and an analog-to-digital conversion module are usually provided at the output terminal of the transformer T, so that the current through the transformer T is integrated into a voltage signal that lags the current through the transformer T by 90 degrees. The waveform diagram of the digital voltage signal and current signal obtained after being amplified by the amplifier U1 and converted from analog to digital is referred to FIG. 10, which is a waveform diagram of key parameters when the switching transistor in the leading leg is controlled in the conventional technology, FIG. 10 includes the switching period of each switching transistor in the phase-shifted full-bridge circuit, the drive signals PWM_Q1 to PWM_Q4, the current through and the digital voltage signal across the transformer T. It can be seen that from the time instant at which the switching transistor on the lagging leg is turned on to the time instant at which the switching transistor on the lagging leg is turned off, the digital voltage signal is in a monotonically increasing or monotonically decreasing state, so that when the digital voltage signal reaches the preset voltage threshold, the corresponding switching transistor on the leading leg can be controlled to be turned off. However, from FIG. 10, it can be seen that the digital voltage signal is close to 0 in the time period between t0 and ta, which is difficult to identify. By controlling through the circuit, that is, by directly controlling the switching transistor on the leading leg by using the current through the transformer T, the corresponding switching transistor on the leading leg is controlled to be turned off when the current through the transformer T reaches the preset current threshold value in the conventional technology. Reference is made to FIG. 11, which is another waveform diagram of key parameters when the switching transistor in the leading leg is controlled in the conventional technology. It can be seen from FIG. 11 that the current gradually increases between the time instants t0 and t1, and the current decreases after the time instant t1. The current decreases between the time instants t1 and t4, the actual output current of the transformer T is increased, and the direction of the current is in the opposite. Therefore, if the switching transistor on the leading leg is controlled by using the current through the transformer T from the time instants t1 to t4, the control process is very complicated. In this case, detection and control are usually performed in only the range of t0-tb. The current threshold in the conventional technology may be calculated based on the output current, output voltage or power of the DC-DC converter. In addition, when the switching transistor on the leading leg is controlled by the current through the transformer T, the current through the transformer T first increases and then decreases from the time instant t0 to the time instant t4 in FIG. 11, and the current through the transformer T first decreases and then increases from the time instant t0 to the time instant t10. If the switching transistor on the leading leg is only controlled by using only the current signal of the transformer T, since the current through the transformer T is a sinusoidal current, when the DC-DC converter outputs medium and low power, the current through the LC resonant circuit may be controlled to be within 0 degree to 90 degrees, and if the DC-DC converter outputs high power, the current through the LC resonant circuit enters the range of 90 degrees to 180 degrees. Since the current in the phase from 0 degree to 90 degrees increases monotonically, the current in the phase from 90 degrees to 180 degrees decreases monotonically, the same current value corresponds to two time points. If the switching transistor in the leading leg is controlled at the wrong time point, the output current of the DC-DC converter may be different from the expected current, leading to a deviation in the maximum power tracking of the DC-DC converter, such that the DC-DC converter restarts frequently and the system cannot work normally.

Figure 12:
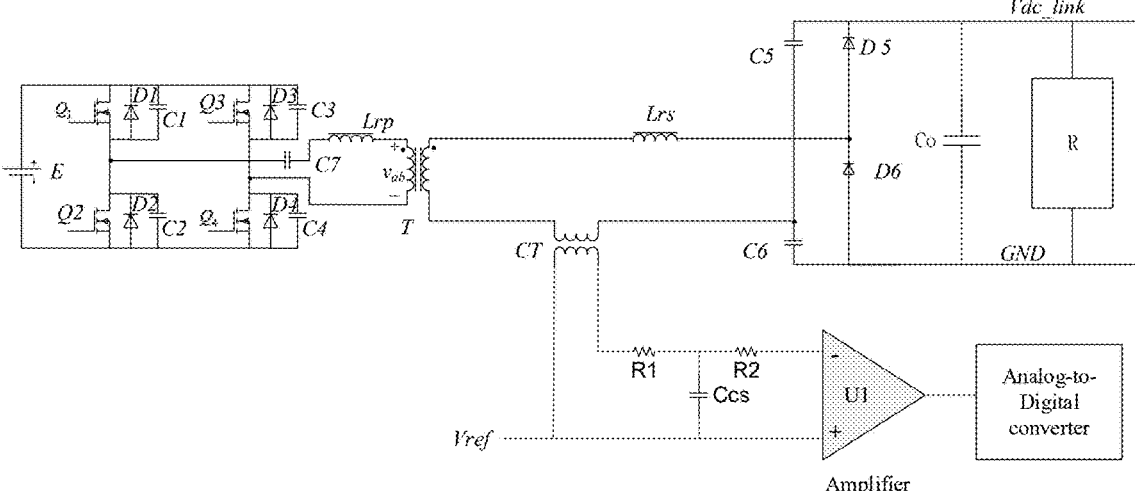
FIG. 12 is a schematic structural diagram of a DC-DC converter provided with a current transformer according to the present disclosure.
Figure 13:
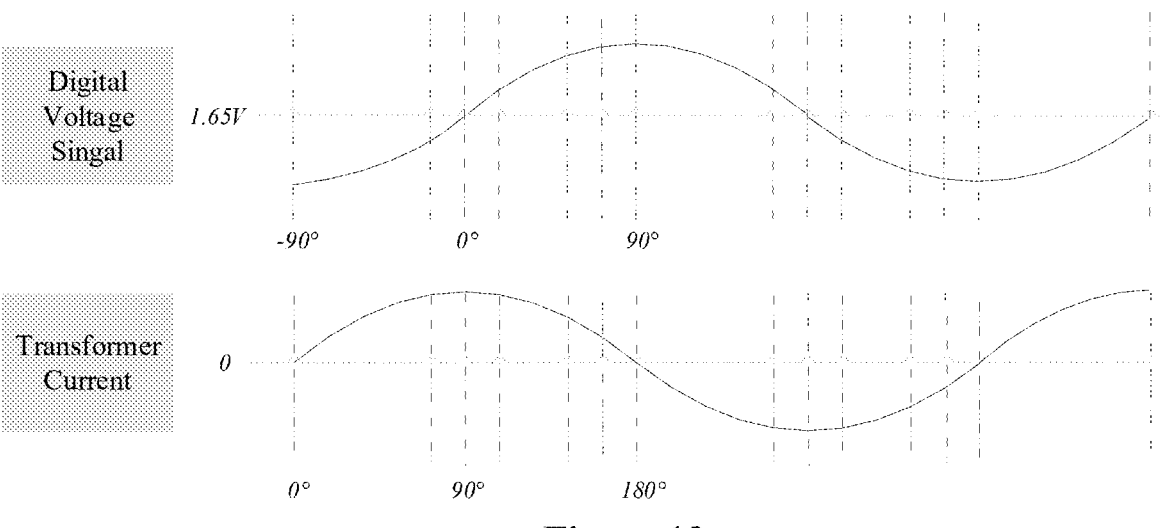
FIG. 13 is a waveform diagram of a current and a digital voltage signal of a transformer after a bias voltage is applied according to the present disclosure.
Figure 14:
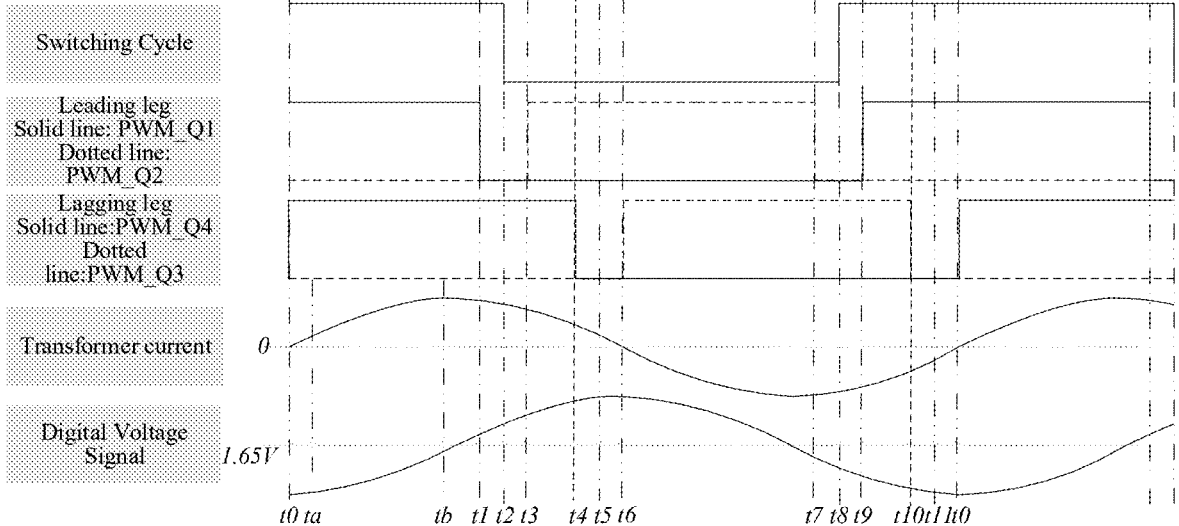
FIG. 14 is a waveform diagram of key parameters in a DC-DC converter according to another embodiment of the present disclosure.

In an embodiment, it is considered that the bearing capacity of the load for the power outputted by the DC-DC converter is limited. Therefore, in order to prevent an excessive output power of the DC-DC converter which causes abnormal operation, and in order to solve the above technical problems, a bias voltage Vref is applied to the positive input terminal of the amplifier U1 of the DC-DC converter. Reference is made to FIG. 12, which is a schematic structural diagram of a DC-DC converter provided with a current transformer according to the present disclosure, where the bias voltage Vref may be but is not limited to 1.65V. Reference is made to FIG. 13, which is a waveform diagram of a current and a digital voltage signal of a transformer T after a bias voltage is applied according to the present disclosure. The waveform of the voltage output by the amplifier U1 is shown in FIG. 14, which is a waveform diagram of key parameters in a DC-DC converter according to another embodiment of the present disclosure, and includes the switching period of each switching transistor in the phase-shifted full-bridge circuit, the drive signals PWM_Q1 to PWM_Q4, the current through the transformer T and the voltage signal output by the amplifier U1. The voltage signal output by the amplifier U1 is positive due to the applied bias voltage Vref, which solves the problem in the conventional technology that when the voltage signal is less than 0, it cannot be used as the basis for controlling the switching transistor on the leading leg.

In an embodiment of the present disclosure, in order to ensure that the output power of the DC-DC converter is the desired power required by the load, it is necessary to determine whether the current through the transformer T reaches the desired current value before controlling the switching transistor on the leading leg to be turned off. When the desired current value is reached, the switching transistor on the leading leg is controlled to be turned off, so that the DC-DC converter can provide the desired power for the load and meet the power demand of the load.

In the present disclosure, when the switching transistor on the leading leg is controlled to be turned off, it is necessary to determine, after the corresponding switching transistor on the lagging leg is turned on, whether the digital voltage signal reaches the voltage threshold, and when the threshold is reached, the corresponding switching transistor on the leading leg is turned off to ensure that the power input to the load can make the load work normally.

After the fourth switching transistor Q4 is turned on, it is determined whether the digital voltage signal reaches the voltage threshold, and when it is determined that the digital voltage signal reaches the voltage threshold, the first switching transistor Q1 is controlled to be turned off. After the third switching transistor Q3 is turned on, it is determined whether the digital voltage signal reaches the voltage threshold, and when it is determined that the digital voltage signal reaches the voltage threshold, the second switching transistor Q2 is controlled to be turned off. Since the first switching transistor Q1 and the second switching transistor Q2 are connected to the direct-current power supply E, the input of the direct-current power supply E is stopped when the first switching transistor Q1 and the second switching transistor Q2 are turned off.

Figure 15:
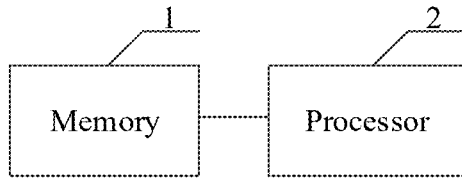
FIG. 15 is a schematic structural diagram of a device for controlling a switching transistor according to the present disclosure.

Reference is made to FIG. 15, which is a schematic structural diagram of a device for controlling a switching transistor according to the present disclosure, and the device includes:

a memory 1, configured to store a computer program; and a processor 2, configured to execute the computer program to implement the above-mentioned steps in the method for controlling the switching transistor.

The introduction of the device for controlling the switching transistor according to the present disclosure may be referred to the above embodiments, which is not repeated in the present disclosure.

In order to solve the above technical problems, a direct-current to direct-current converter is provided in the present disclosure, including the device for controlling the switching transistor mentioned above, a direct-current power supply, a phase-shifted full-bridge circuit, a transformer and a rectifier circuit provided with an LC resonant circuit connected in sequence, and further including:

a current transformer, an amplifier and a comparator connected in sequence; where an input terminal of the current transformer is connected to the transformer, and the current transformer is configured to collect a current through the transformer;

the amplifier is configured to amplify the current through the transformer and collected by the current transformer, and output an amplified current signal; and the comparator is configured to compare the amplified current signal with a preset current value, and output a third level based on determination that the amplified current signal is less than or equal to the preset current value, and output a fourth level based on determination that the amplified current signal is greater than the preset current value, and the third level is opposite to the fourth level.

The introduction of the direct-current to direct-current converter according to the present disclosure may be referred to the above embodiments, which is not repeated in the present disclosure.

It should be noted that the relationship terms, such as first, second, or the like, in this specification are only used to distinguish one entity or operation from another entity or operation, and do not necessarily require or imply that there is an actual relationship or sequence between these entities or operations. Furthermore, terms "include", "comprise" or any other variants thereof are intended to be non-exclusive. Therefore, a process, method, article or device including a series of elements includes not only the elements but also other elements that are not enumerated or other elements inherent to such process, method, article or device. Unless expressively limited otherwise, a process, method, article or device limited by "comprising/including a(n) . . ." does not exclude existence of another identical element in such process, method, article or device.

Those skilled in the art can implement or practice the present disclosure based on the above description of the disclosed embodiments. Various modifications to the embodiments are apparent for the skilled in the art. The general principle defined herein may be implemented in other embodiments without departing from the spirit or scope of the present disclosure. Hence, the present disclosure is not limited to the embodiments disclosed herein, but is to conform to the widest scope in accordance with the principles and novel features disclosed herein.

The invention claimed is:

1. A method for controlling a switching transistor, applicable to a direct-current to direct-current (DC-DC) converter, wherein the DC-DC converter comprises a direct-current power supply, a phase-shifted full-bridge circuit, a transformer, and a rectifier circuit provided with an LC resonant circuit; and the method comprises:

determining, after a switching transistor on a leading leg of the phase-shifted full-bridge circuit is turned off, whether a current through the transformer is less than or equal to a preset current value; and controlling a corresponding switching transistor on a lagging leg of the phase-shifted full-bridge circuit to be turned off based on determination that the current through the transformer is less than or equal to the preset current value, wherein the DC-DC converter further comprises a current transformer, an integrator circuit, an amplifier and a comparator connected in sequence;

wherein an input terminal of the current transformer is connected to the transformer, the current transformer is configured to collect a current through the transformer; the integrator circuit is configured to integrate the current through the transformer to obtain a voltage signal; a bias voltage is applied to a positive input terminal of the amplifier, the amplifier is configured to amplify the voltage signal and add the bias voltage, and output an amplified voltage signal; the comparator is configured to compare the amplified voltage signal with a maximum integration threshold and a minimum integration threshold, output a first level based on determination that the amplified voltage signal is greater than the maximum integration threshold or less than the minimum integration threshold, and output a second level based on determination that the amplified voltage signal is less than the maximum integration threshold and greater than the minimum integration threshold; and the first level is opposite to the second level;

wherein the determining, after the switching transistor on the leading leg of the phase-shifted full-bridge circuit is turned off, whether the current through the transformer is less than or equal to the preset current value comprises:

controlling the integrator circuit to integrate the current through the transformer and collected by the current transformer within an integration period to obtain the voltage signal, wherein the integration period starts from a time instant at which the switching transistor on the lagging leg of the phase-shifted full-bridge circuit is turned on, and ends at a time instant at which the comparator begins outputting the second level;

determining a phase-shift angle period based on the integration period and a resonance parameter of the LC resonant circuit;

determining whether the phase-shift angle period expires from a time instant at which the switching transistor on the leading leg of the phase-shifted full-bridge circuit is turned off, while determining whether the current through the transformer is less than or equal to the preset current value; and proceeding to the step of controlling the corresponding switching transistor on the lagging leg of the phase-shifted full-bridge circuit to be turned off based on determination that the current through the transformer is less than or equal to the preset current value at expiry of the phase-shift angle period.

2. The method according to claim 1, wherein after the determining the phase-shift angle period based on the integration period and a resonance parameter of the LC resonant circuit, the method further comprises:

determining a maximum phase-shift angle period;

determining whether the phase-shift angle period is less than the maximum phase-shift angle period;

proceeding to the step of determining whether the phase-shift angle period expires from a time instant at which the switching transistor on the leading leg of the phase-shifted full-bridge circuit is turned off, based on determination that the phase-shift angle period is less than the maximum phase-shift angle period;

determining whether the maximum phase-shift angle period expires from a time instant at which the switching transistor on the leading leg of the phase-shifted full-bridge circuit is turned off, based on determination that the phase-shift angle period is greater than or equal to the maximum phase-shift angle period; and proceeding to the step of controlling the corresponding switching transistor on the lagging leg of the phase-shifted full-bridge circuit to be turned off based on determination that the maximum phase-shift angle period expires.

3. The method according to claim 2, wherein the determining the maximum phase-shift angle period comprises:

determining the maximum phase-shift angle period based on junction capacitances of respective switching transistors in the phase-shifted full-bridge circuit, a leakage inductance parameter of a primary side of the transformer, the resonance parameter of the LC resonant circuit, an output voltage of the transformer, an output current of the transformer and the integration time period.

4. The method according to claim 2, wherein after the controlling the corresponding switching transistor on the lagging leg of the phase-shifted full-bridge circuit to be turned off, the method further comprises:

determining whether a preset dead period expires from a time instant at which the corresponding switching transistor on the lagging leg of the phase-shifted full-bridge circuit is turned off;

controlling another switching transistor on the lagging leg of the phase-shifted full-bridge circuit to be turned on at expiry of the preset dead period.

5. The method according to claim 4, wherein before determining whether the preset dead period expires from the time instant at which the corresponding switching transistor on the lagging leg of the phase-shifted full-bridge circuit is turned off, the method further comprises:

determining an LC resonant period of a primary side of the transformer based on junction capacitances of respective switching transistors in the phase-shifted full-bridge circuit and a leakage inductance parameter of the primary side of the transformer;

determining a maximum dead period based on the LC resonant period of the primary side of the transformer;

setting the preset dead period based on the maximum dead period, wherein the preset dead period is less than the maximum dead period; and proceeding to the step of determining whether the preset dead period expires from the time instant at which the corresponding switching transistor on the lagging leg of the phase-shifted full-bridge circuit is turned off.

6. The method according to claim 1, wherein the DC-DC converter further comprises a current transformer, an amplifier and a comparator connected in sequence, wherein an input terminal of the current transformer is connected to the transformer, and the current transformer is configured to collect a current through the transformer; the amplifier is configured to amplify the current through the transformer and collected by the current transformer and output an amplified current signal; the comparator is configured to compare the amplified current signal with a preset current value, output a third level based on determination that the amplified current signal is less than or equal to the preset current value, and output a fourth level based on determination that the amplified current signal is greater than the preset current value; and the third level is opposite to the fourth level;

the determining, after the switching transistor on the leading leg of the phase-shifted full-bridge circuit is turned off, whether the current through the transformer is less than or equal to the preset current value comprises:

determining, after the switching transistor on the leading leg of the phase-shifted full-bridge circuit is turned off, whether an output signal of the comparator is the third level; and proceeding to the step of the step of controlling the corresponding switching transistor on the lagging leg of the phase-shifted full-bridge circuit to be turned off based on determination that the output signal of the comparator is the third level.

7. The method according to claim 1, wherein before the determining, after the switching transistor on the leading leg of the phase-shifted full-bridge circuit is turned off, whether the current through the transformer is less than or equal to the preset current value, the method further comprises:

determining an expected value for the current through the transformer based on a load connected to an output terminal of the DC-DC converter;

determining, after the corresponding switching transistor on the lagging leg is turned on, whether the current through the transformer reaches the expected value;

controlling the switching transistor on the leading leg of the phase-shifted full-bridge circuit to be turned off based on determination that the current through the transformer reaches the expected value; and proceeding to the step of determining, after the switching transistor on the leading leg of the phase-shifted full-bridge circuit is turned off, whether the current through the transformer is less than or equal to the preset current value.

8. A device for controlling a switching transistor, comprising:

a memory, configured to store computer instructions; and a processor, configured to execute the computer instructions to implement steps of the method for controlling the switching transistor according to claim 1.

9. A direct-current to direct-current converter, comprising the device for controlling the switching transistor according to claim 8, further comprising a direct-current power supply, a phase-shifted full-bridge circuit, a transformer and a rectifier circuit provided with an LC resonant circuit connected in sequence, and further comprising:

a current transformer, an amplifier and a comparator connected in sequence; wherein an input terminal of the current transformer is connected to the transformer, and the current transformer is configured to collect a current through the transformer;

the amplifier is configured to amplify the current through the transformer and collected by the current transformer, and output an amplified current signal; and the comparator is configured to compare the amplified current signal with a preset current value, and output a third level based on determination that the amplified current signal is less than or equal to the preset current value, and output a fourth level based on determination that the amplified current signal is greater than the preset current value, and the third level is opposite to the fourth level.

* * * * *